(12) United States Patent
Boyet et al.

(10) Patent No.: US 7,929,685 B1
(45) Date of Patent: Apr. 19, 2011

(54) QUEUING CALLS FOR DISTRIBUTION

(75) Inventors: Robert B. Boyet, Austin, TX (US);
Theresa E. Beloin, Austin, TX (US);
Seth E. Willis, Cedar Park, TX (US);
Roger C. Meador, Austin, TX (US);
Marcus J. Ward, Austin, TX (US)

(73) Assignee: Apple Inc., Cupertino, CA (US)

( * ) Notice: Subject to any disclaimer, the term of this patent is extended or adjusted under 35 U.S.C. 154(b) by 2053 days.

(21) Appl. No.: 10/854,939

(22) Filed: May 27, 2004

(51) Int. Cl.
*H04M 3/00* (2006.01)
*H04M 5/00* (2006.01)

(52) U.S. Cl. ......... 379/265.02; 379/265.09; 379/265.12; 379/265.13; 379/266.01; 379/266.02; 379/309

(58) Field of Classification Search ............ 379/265.02, 379/265.12, 265.09, 265.13, 266.01, 266.02, 379/309; 710/6
See application file for complete search history.

(56) References Cited

U.S. PATENT DOCUMENTS

| | | | | |
|---|---|---|---|---|
| 5,625,680 A | * | 4/1997 | Foladare et al. | 379/199 |
| 5,933,492 A | * | 8/1999 | Turovski | 379/265.02 |
| 6,389,024 B1 | | 5/2002 | Ghai et al. | 370/395.31 |
| 6,535,600 B1 | * | 3/2003 | Fisher et al. | 379/265.12 |
| 6,553,113 B1 | * | 4/2003 | Dhir et al. | 379/265.02 |
| 6,560,329 B1 | | 5/2003 | Draginich et al. | 379/265.02 |
| 6,603,847 B1 | | 8/2003 | Griffith | 379/211.02 |
| 6,611,590 B1 | * | 8/2003 | Lu et al. | 379/265.09 |
| 6,665,395 B1 | * | 12/2003 | Busey et al. | 379/265.09 |
| 6,668,286 B2 | * | 12/2003 | Bateman et al. | 710/6 |
| 6,707,904 B1 | | 3/2004 | Judkins et al. | |
| 7,050,567 B1 | * | 5/2006 | Jensen | 379/266.01 |
| 7,376,227 B2 | | 5/2008 | Anisimov et al. | |
| 7,573,998 B2 | | 8/2009 | Kessinger et al. | |
| 2003/0195753 A1 | * | 10/2003 | Homuth | 705/1 |
| 2004/0062380 A1 | * | 4/2004 | Delaney | 379/265.02 |
| 2004/0208309 A1 | * | 10/2004 | Miloslavsky | 379/265.02 |
| 2005/0093881 A1 | * | 5/2005 | Okita et al. | 345/589 |
| 2006/0146806 A1 | * | 7/2006 | Khuc et al. | 370/352 |
| 2008/0043985 A1 | | 2/2008 | Fama et al. | |
| 2008/0267387 A1 | * | 10/2008 | Strathmeyer et al. | 379/265.09 |
| 2009/0274290 A1 | | 11/2009 | Owens et al. | |

* cited by examiner

*Primary Examiner* — Quynh H Nguyen
(74) *Attorney, Agent, or Firm* — Williams, Morgan & Amerson, P.C.

(57) ABSTRACT

A system and method gathers data from callers and call center sites and incorporates that information in call routing decisions. To make call routing decisions, a database structure keeps track of the calls in a queue before efficiently distributing the calls to agents at various call center sites. In one embodiment, a call routing system may comprise a web application server, a caller server, and a call center server. A method for distributing a call from a caller to a call center site may comprise collecting a first dataset relating to the call from the caller, queuing the call based on the first dataset, collecting a second dataset from the call center site, and routing the call to the call center site based on the first and second datasets.

35 Claims, 6 Drawing Sheets

QUEUING CALLS FOR DISTRIBUTION

BACKGROUND OF THE INVENTION

1. Field of the Invention

This invention relates generally to an automated call distribution system that routes calls between a network and call center sites.

2. Description of the Related Art

Most call or contact centers serve commercial institutions including financial institutions. Typically, in a call center serving a financial institution, when a call is received from a customer, the call is handled based on an availability of an agent at a call center site. An attempt is made to handle the calls rapidly to reduce wait times and agent cycle times. There is concerted effort to make the wait times in the order of twenty seconds average speed of answer and two to three minutes of talk time.

In a virtual call center environment, call center sites may be located in multiple locations across the world, operating as a single entity. Most call center sites are built on a model of very high cycle time with large volume of calls. In a medium call center environment, however, where call durations may be on average fifteen to twenty minutes each, agents talking with the customers for longer times while some customers may be waiting for ten minutes to half an hour to talk to a next available agent, a non uniform distribution of calls occurs when routing calls across multiple call center sites. In other words, a call routing system may send a large volume of calls to one call center site and cycle back to send a large volume of calls to another call center site. As a result, the agents at various call center sites may not be efficiently utilized to answer calls by the call routing system. For example, overloading of one call center site may occur while underutilization of another call center site occurs. This may cause various problems including loss of efficiency, higher costs, and customer dissatisfaction.

The present invention is directed to overcoming or at least reducing one or more of the problems set forth above.

SUMMARY OF THE INVENTION

In one aspect of the present invention, a method for distributing a call from a caller to a call center site is provided. The method includes collecting a first dataset from a caller, queuing the call based on the first dataset, collecting a second dataset from the call center site, and routing the call to the call center site based on the first and second datasets.

In another aspect of the present invention, a system for distributing a call from a caller to a call center site is provided. The system includes a web application server including a memory storing a web application to route the call to the call center site, a first server communicatively coupled to the web application server to collect a first dataset from the caller to queue the call based on the first dataset, and determine routing of the call, and a second server communicatively coupled to the first server to collect a second dataset from the call center site to update queuing of the call based on the first and second datasets.

In yet another aspect of the present invention, an article is provided that comprises a computer readable storage medium storing instructions that, when executed cause a processor-based system to collect a first dataset from a caller, queue a call based on the first dataset, collect a second dataset from a call center site, and route the call to the call center site based on the first and second datasets.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide a network queuing system for call or contact centers located at geographically separate call center sites. The network queuing system allows customer phone calls to queue up at a network level, while activity and/or capacity at the various call center sites is monitored. When an agent becomes available at a call center site, the call is then transferred to that call center site. Various parameters may be set to adjust the flow of calls, for example, call center sites may be immediately turned off for emergencies of special events, and the calls will continue to flow to the still-open call center sites. The number of customers allowed to queued at the call center site itself may also be adjusted to reduce agent availability. The percentage of volume going to any particular call center site may also be adjusted.

Figure 1:
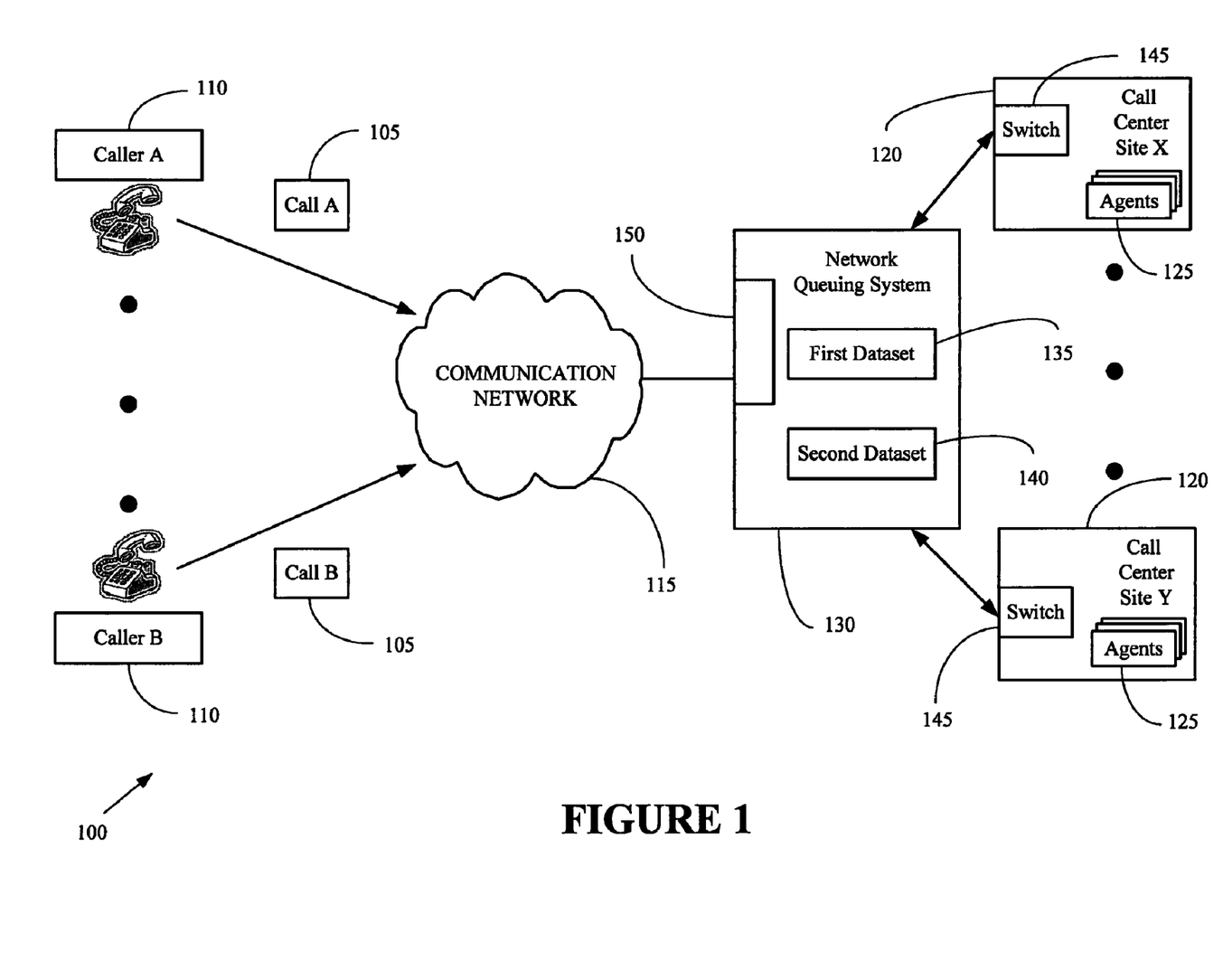
FIG. 1 illustrates a call routing system according to one embodiment of the present invention.

Referring to FIG. 1, a call routing system 100 for distributing calls 105 from callers 110 to one or more call center sites 120 on a communication network 115 is provided in accordance with one embodiment of the present invention. The term caller 110 may represent any number of calls from any type of communication device. Examples of the communication network 115 include a public switched telephone network (PSTN), a private branch exchange plan (PBX), a wireless network, an Internet network, or a combination of networks. Based upon various factors described below, the call routing system 100 determines an efficient routing/distribution of calls 105 to various call center sites 120. When, in the call routing system 100, a call A 105 is received from a caller A 110, the call is handled at a particular call center site X 120 based on an availability of agents 125.

To route the call to a particular call center site 120, the call routing system 100 includes a network queuing system 130. In one embodiment, the network queuing system 130 stores a first dataset 135 from the caller A 110 and a second dataset 140 from the call center site X 120.

In one embodiment, the first dataset 135 may comprise a number of caller parameters including a session identification number (ID) of each individual caller 110, the time each caller 110 entered the queue, an ID indicating a queue to which a caller has indicated a desire to go into and the like. The second dataset 140 may include one or more call center parameters including, but not limited to, the number of agents 125 staffed, the number of agents 125 available, the number of agents 125 after call work, the number of agents 125 that are on a call, the number of agents 125 in an idle state, the number of calls waiting at each call center site, and the like. Other call center parameters may include the number of calls 105 taken in the last half hour, average call duration, the number of calls 105 abandoned, the average length of abandoned calls 105 in the last half hour period itself, among others.

In operation, the caller 110 using a user interface, such as a key pad or voice, inserts the call 105 in a queue, indicating a type of service desired, such as needing either a desktop or portable computer technical support. Based on the type of service desired, each call is inserted in a particular queue. For example, in a voice-based user interface embodiment, a variety of speech recognition software may be used to determine the customer selection, which in turn, determines the queue in which the call 105 is interested.

To communicate with the network queuing system 130, each call center site 120 includes a switch 145. The switches 145 may be capable of connecting to a public telephone network, a private network, or a combination of two or more networks. For example, any of one telephony standards, such as analog loop start, digital PBX, and other similar telephony standards may be used for communicating calls between the network queuing system 130 and the call center sites 120. Likewise, the switches 145 may connect to the communication network 115 via the network queuing system 130 using any one of interfaces, such as an Integrated Services Digital Network (ISDN) interface, an Internet interface, a wireless interface, or a Plain Old Telephone System (POTS) interface. While the Integrated Services Digital Network is a digital telephony scheme that allows a user to connect to the Internet over standard phone lines at speeds higher than a 56K modem allows, the Plain Old Telephone System Service is a basic telephone service supplying standard single line telephones, telephone lines, and access to the public switched network with functionally limited to simply placing and receiving calls. In this manner, the callers 110 may be communicating and interacting with the agents 125 in an automatic manner.

The network queuing system 130 may include a telephony interface 150, which couples the communication network 115 to one or more call center sites 120 on telephone lines via the switches 145. However, the forms of the telephony interface 150 and the switches 145 may depend on the form of the communication network 115 and the form of the calls 105. For example, if the communication network 115 is an IP network and the calls 105 are based on a conventional telephony standard, the switches 145 may be capable of interacting with computers with IP telephony interfaces and servers. If the communication network 115 is a wireless network, the switches 145 may be capable of handling cellular signals with cellular modems. For example, each switch 145 may operate according to the code division multiple access branch (CDMA) standard or the Global System for Mobile Communications. (GSM) standard, which is a land mobile pan-European digital cellular radio communications system.

If the communication network 115 is a PSTN with a PBX and the calls are audio calls, the switches 145 may connect to telephones under computer control. For example, a computer with an ISDN card and circuit switched voice hardware may enable communication with the network queuing system 130. For example, the network queuing system 130 may transmit signals to the call center sites 120 based on an analog loop start telephony protocol.

In one embodiment, the network queuing system 130 may employ a voice web portal software to route calls 105. For example, Telera Corporation® now acquired by Compagnie Financière Alcatel, Paris, France manufactures voice web portal software, which is available from Genesys System Corporation of Lynden Wash., USA. An Interactive Voice Response (IVR) software is also available that is controlled via Voice eXtensible Markup Language (VoiceXML or VXML)—a specification for accessing voice recognition software via the Internet. In this manner, an IVR instance may be deployed in a VXML environment. To route calls, the IVR software may queue and distribute the calls 105 based on query-driven databases of data collected from the received calls 105 and call center sites 120, respectively.

For collecting data from the switches 145 associated with the call center sites 120, an application such as scripts resident at the network queuing system 130 may automatically and periodically either acquire call center data or actively receive the same from the switches 145. For example, the scripts may run a report at each switch 145 located at a call center site 120. The scripts may scrape a dataset from a screen displayed on a terminal at the call center site 120 and parse it into a query-driven database. In one embodiment, the query-driven database may utilize a Structured Query Language (SQL)-based relational database, such as mySQL. The SQL is a standard interactive and programming language for getting information from and updating a database.

In one embodiment, customer passage from the call routing system 100 may be tracked right from receiving the call 105 based on selection of menu options, assigning of certain session IDs and dialing to specific call center sites 120. In this way, customer experience about the call handling may be tracked and reported for any further changes.

Figure 2:
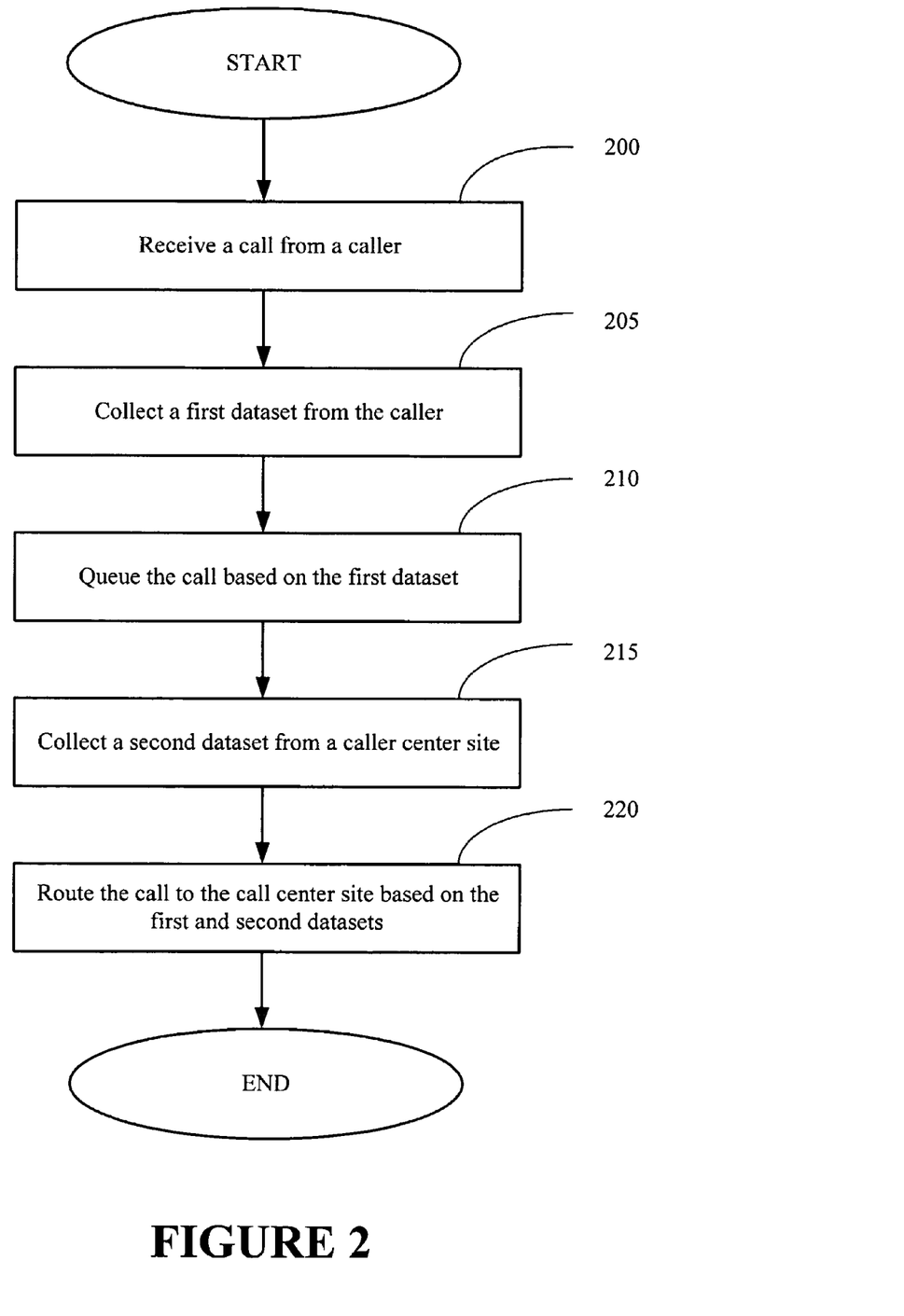
FIG. 2 illustrates a stylized representation of a method for distributing a call from a caller to a call center site in accordance with one illustrative embodiment of the present invention.

Referring to FIG. 2, a stylized representation of a method for distributing the calls 105 from callers 110 to call center sites 120 according to one embodiment of the present invention is depicted. At block 200, the network queuing system 130 may receive a call A 105 from a caller A 110 on the communication network 115. For example, a customer may dial a toll free number. When the call A 105 reaches the communication network 115, such as a telephone service provider network, the call A 105 may be directed to a hosting facility of the telephone service provider. The hosting facility may be capable of collecting the first dataset 135 relating to the call 105 from the caller A 110, as indicated in block 205. The network queuing system 130 may queue the call A 105 based on the first dataset, as shown in block 210. At block 215, the network queuing system 130 may collect the second dataset 140 from a call center site X 120. Based on the first and second datasets, the network queuing system 130 may route the call A 105 to the call center site X 120, as indicated in block 220.

Figure 3:
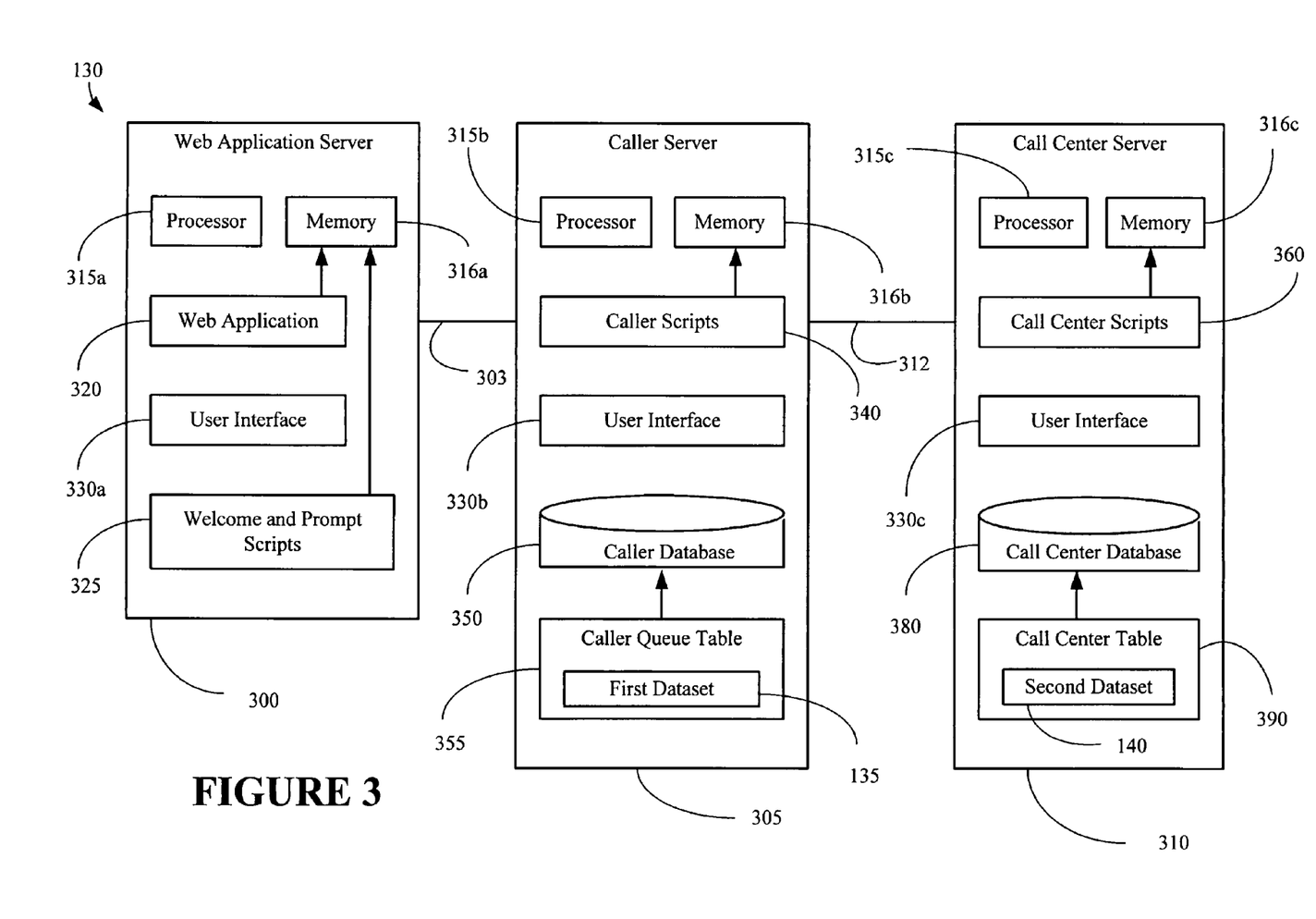
FIG. 3 illustrates a network queuing system shown in FIG. 1 in accordance with one illustrative embodiment of the present invention.

Turning to FIG. 3, the network queuing system 130 shown in FIG. 1 is depicted in accordance with one embodiment of the present invention. The network queuing system 130 may comprise a web application server 300, a caller server 305, and a call center server 310. Each of the web application server 300, the caller server 305, and the call center server 310 may include program code for establishing appropriate communications over communication links. For example, the web application server 300 may communicate with the caller server 305 over a link 303, which may be a wireline or a wireless communication connection. Likewise, the caller server 305 may communicate with the call center server 310 over a link 312, which may be a wireline or a wireless communication connection.

The web application server 300 may comprise a processor 315*a* and a memory 316*a* capable of storing a web application 320 in accordance with one embodiment of the present invention. The memory 316*a* may store scripts 325, which may include welcome and prompt scripts for the caller A 110. The welcome and prompt scripts 325 may include code, such as for playing music, messages or providing instructions, and acquiring data. The processor 315*a* may execute the web application 320 and the scripts 325 to route the call A 105 to a call center site X 120 shown in FIG. 1. The web application server 300 may further comprise a user interface 330*a* capable of receiving any user input and providing output to a user.

The caller server 305 may be communicatively coupled to the web application server 300 to collect the first dataset 135 from the caller A 110, queue the call A 105 based on the first dataset 135, and determine routing of the call A 105 consistent with one embodiment of the present invention. To this end, the caller server 305 may include a processor 315*b* and a memory 316*b* storing caller scripts 340. While the processor 315*b* may execute a variety of code including the caller scripts 340, the memory 316*b* may store other program code for establishing communications with the web application server 300. The caller server 305 may further include a user interface 330*b* and a caller database 350 storing a caller queue table 355 including the first dataset 135.

In one embodiment, the caller information, i.e., the first dataset 135 may be saved as the caller queue table 355 in the caller database 350 at the caller server 305. For example, a row of the caller queue table 355 may represent a caller. In this manner, callers 110 get queued up in the caller queue table 355 in a first-in first-out (FIFO) manner, waiting for an available agent 125 at a call center site 120. Other queuing configurations may be implemented, such as queuing based upon types of service requested. For each caller, the caller queue table 355 may contain the session ID and other information obtained from the caller 110 who interacts with the web application 320 in a series of prompts. Other information may include product information comprising serial number and model name.

The call center server 310 may be communicatively coupled to the caller server 305 to provide the second dataset 140 to the call center sites 120 to update queuing of the call A 105 based on the first dataset 135 and the second dataset 140. The call center server 310 may further include a user interface 330*c* and call center scripts 360 stored in the memory 316*c*. The processor 315*c* may execute the call center scripts 360 to update the second dataset 140. The call center server 310 may further comprise a call center database 380 storing a call center table 390 including the second dataset 140.

Consistent with one embodiment, the call center information, i.e., the second dataset 140 may be stored in the call center database 380 as the call center table 390, a table of rows and columns, accessible via SQL queries. In one embodiment, the call center database 380 gets updated every 10 seconds by running the report on the switches 145 at the call center sites 120. Alternatively, the call center data may be provided by the call center sites 120 via a File Transfer Protocol (FTP). Thereafter, the call center data may be imported in the call center database 380 as the call center dataset. In this way, after a predetermined update period, (e.g., a ten second cycle time) the call center database 380 contains the current status of the switches 145 at the call center sites 120. Accordingly, the call center dataset, i.e., the second dataset 140 may be used to make decisions regarding routing of the calls 105.

The call center database 380 at the call center server 310 stores the call center table 390, defining status of different queues for each call center site 120. For example, the call center table 390 may contain information about whether and when a call center site is closed or not for skills, holidays, meetings, or emergencies, etc. One call center site queue may be turned off so that agents of the call center site can assist other call center sites. In this manner, the call center sites 120 may appear to be open or closed for taking calls 105 regardless of physical location. A web-based graphical user interface 330*c* at the call center server 310 may enable this control of call center site queues.

When a call comes in the web application 320, such as a VXML application, the web application 320 may read a welcome message and the caller 110 is assigned a unique session identification number (ID). The web application 320 performs a database lookup of the caller database 350 to determine whether a call center site session ID is assigned. However, the caller queue table 355 may get automatically updated by the caller scripts 340, which constantly monitor each queue of callers and the call center database 380 for capacity based on agent availability and/or agent workload. Upon determining that certain capacity is available at the call center sites 120, the caller scripts 340 update the calls waiting the longest in the caller queue table 355 with phone numbers to which the respective caller 110 should get transferred.

When the web application 320 queries the caller database 350 for a phone number to route the call from the caller 110, the caller server 305 may provide the phone number. If the phone number is provided, the caller 110 gets transferred out to the call center site 120. Otherwise, the caller 110 goes to a wait state, listening to music and/or a message until another query is issued. Upon getting a phone number, the web application 320 updates the caller queue table 355 with time out and then transfers the caller 110 to an appropriate call center site by dialing out using the phone number. A flag is set in the caller queue table 355, indicating that the caller was actually transferred to a call center site 120 instead of the caller 110 hanging up or abandoning the call 105.

For overflow call rollovers across call center site queues, a number of parameters may be set. One parameter may be a queue priority. The queue priority for a call center site queue answering desktop computer related technical issues may be set at a higher priority over other call center sites to fulfill any contractual needs. Another parameter may be a queue allowance, which is the actual number of calls allowed to be queued at a particular call center site. In one embodiment, a rollover rate may depend upon the number of agents 125 at a call center site and their proficiency. Other rule-based queuing may be implemented and remain within the spirit and scope of the present invention.

The number of calls waiting in the caller queue table 355, and the number of agents 125 staffed at the call center sites 120 may be used to determine a queue allowance, which is a function of the number of agents in a wrap state. The wrap state of an agent indicates that the agent is finished with the previous call and is in the process of completing the previous call-related formalities and is expected to be available momentarily. Nonetheless, the queue allowance may be either set manually via the call center user interface 330c or automatically.

To this end, a web administrative page may show the number of calls waiting in the caller queue table 355, the percentage of abandoned calls, the number, and percentage of transferred calls being distributed to the call center sites. The web administrative page may be updated at a predetermined duration, e.g., every 10 minutes. The managers of the agents 125 in the call center sites 120 may monitor the web administrative page for maintaining uniform load sharing.

Figure 4:
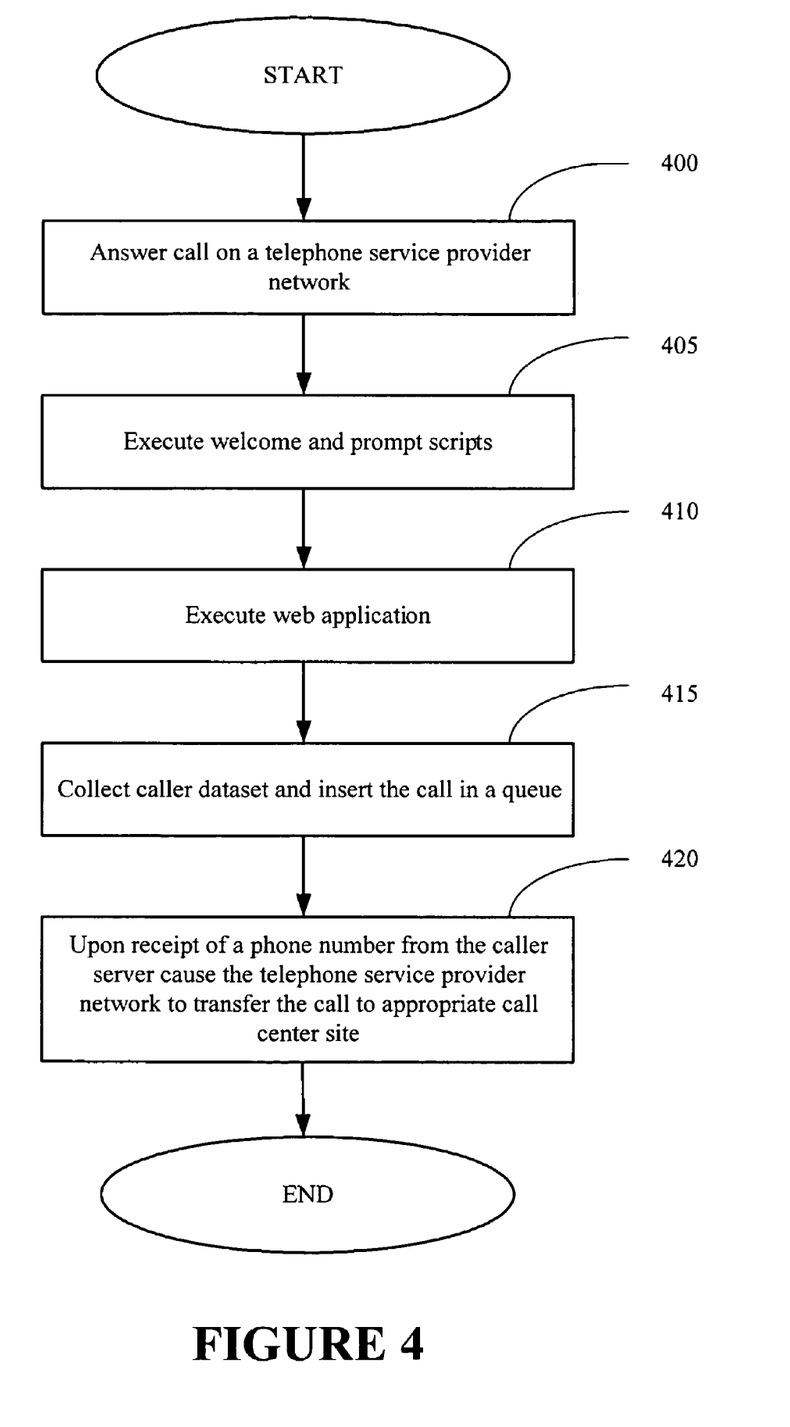
FIG. 4 illustrates a stylized representation of a method for a web application server shown in FIG. 3 to route calls between a network and call center sites in accordance with one illustrative embodiment of the present invention.

Referring to FIG. 4, a stylized representation of a method for distributing a call from a call center site is shown in accordance with one embodiment of the present invention. At block 400, the web application server 300 may answer the call A 105 on the communication network 115, such as on a telephone service provider network. At block 405, the scripts 325 may provide a welcome message and other prompts to the caller A 110 for interactively acquiring information at the user interface 330a in the web application server 300. The processor 315a may execute a program code to prompt the web application 320 to insert the call A 105 in a queue at block 415.

At the block 415, the web application 320 may collect a caller dataset, i.e., the first dataset 135 from the caller A 110. Upon receipt of a phone number from the caller server 305, the web application 320 may cause the communication network 115 (e.g., a telephone service provider network) to transfer the call A 105 to appropriate call center sites, such as the call center site X 120 shown in FIG. 1.

Figure 5:
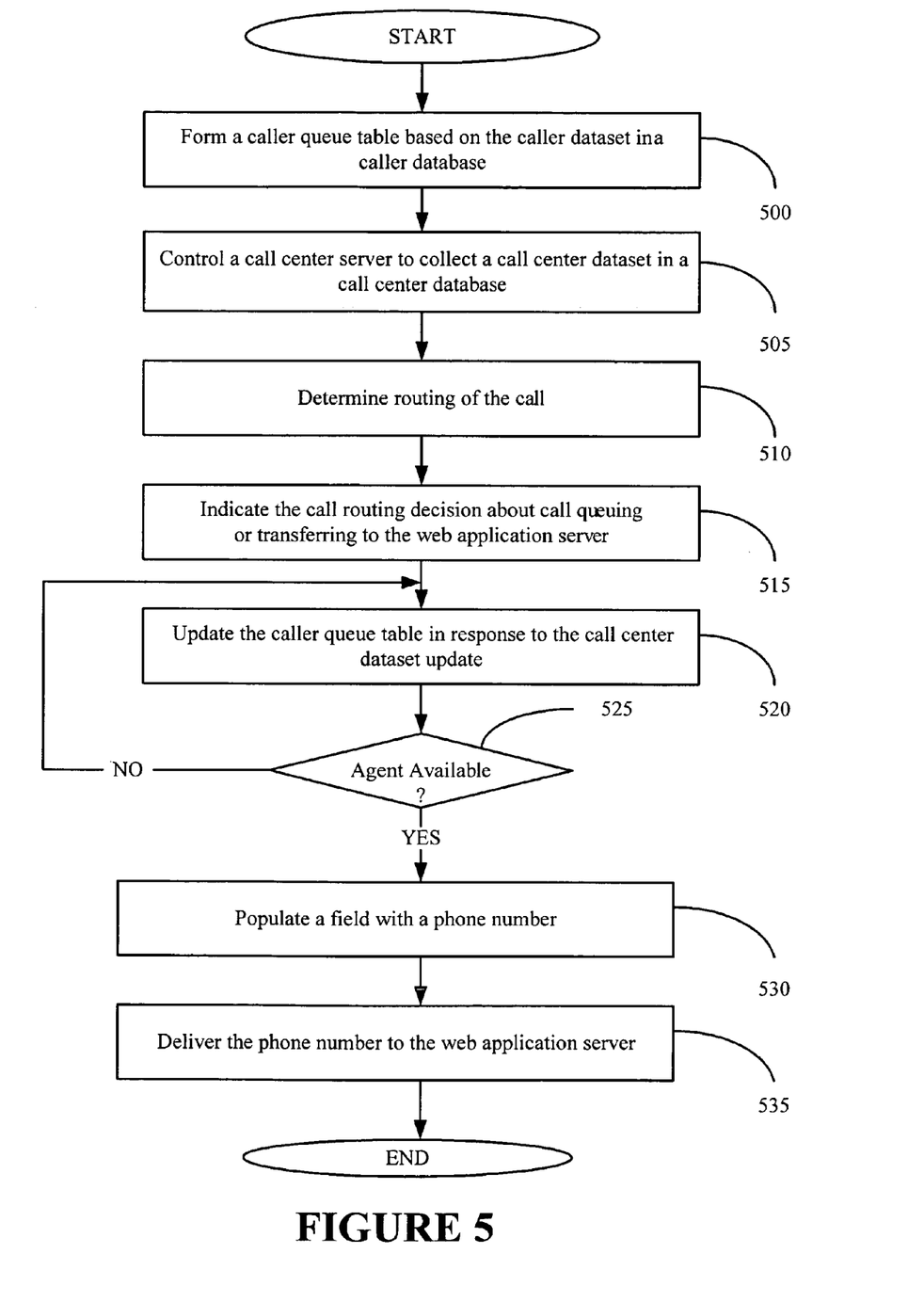
FIG. 5 illustrates a stylized representation of a method for a caller server shown in FIG. 3 to route calls between a network and call center sites in accordance with one illustrative embodiment of the present invention.

Referring to FIG. 5, a stylized representation of a method that queues calls 105 for distribution is shown according to one embodiment of the present invention. The caller server 305 may form the caller queue table 355 based on the caller dataset, such as the first dataset 135 in the caller database 350, as indicated at block 500. The caller server 305 may control the call center server 310, collecting the call center dataset, such as the second dataset 140 in the call center database 380, at block 505.

At block 510, the caller server 305 may determine routing of the call A 105. At block 515, the caller server 305 may indicate the call routing decision about call queuing or transferring to the web application server 300. In response to the call center dataset (the second dataset 140), the caller server 305, may update the caller queue table 355 at block 520. At decision block 525, a determination as to availability of an agent at a particular call center site may be made. If no availability of an agent 125 is indicated at the decision block 525, the caller server 305 continues to update the call center dataset and update in turn the caller queue table 355. However, if an availability for an agent 125 is indicated at the decision block 525, at block 530, the caller server 305 may populate a field with a phone number. The phone number may be delivered to the web application server 300 at block 535 by the caller server 305.

Figure 6:
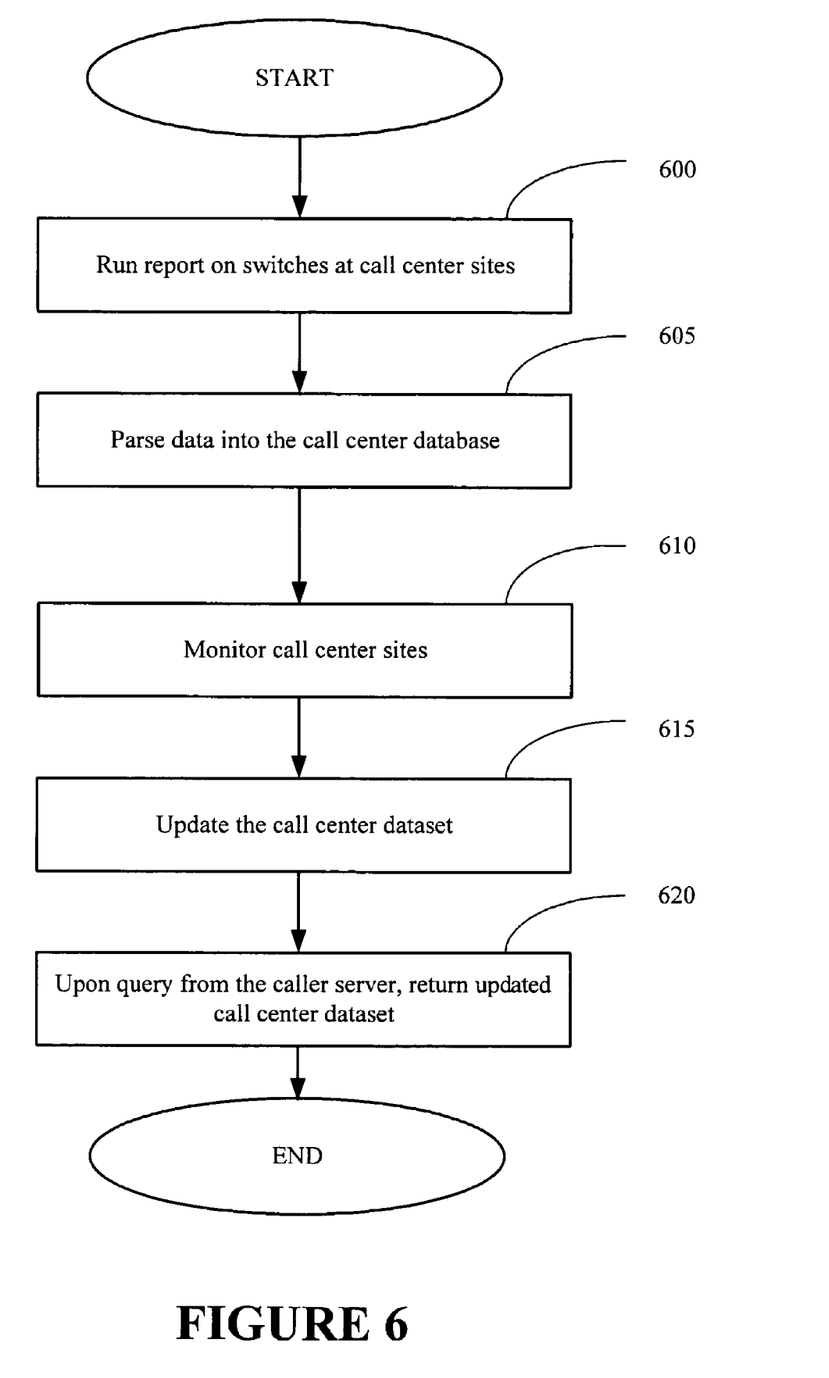
FIG. 6 illustrates a stylized representation of a method for a call center server shown in FIG. 3 to route calls between a network and call center sites in accordance with one illustrative embodiment of the present invention.

Referring to FIG. 6, a stylized representation of a method for updating the queue in which the call A 105 is queued at the web application server 300 is depicted in accordance with one embodiment of the present invention. The call center server 310 may run a report on the switches 145 at the call center sites 120 shown in FIG. 1, at block 600. At block 605, the call center server 310, using the call center scripts 360, may parse the data from the call center sites 120 into the call center database 380. The call center server 310 may monitor the call center sites 120 for one or more call center parameters. At block 615, the call center server 310 may update the call center dataset (e.g., the second dataset 140). Upon receiving a query from the caller server 305, the call center server 310 may return updated call center dataset at block 620.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that network connections may include a variety of other equipment, such as routers, switches, telephone modems, wireless devices, cable modems, digital subscriber lines, and the like. This type of equipment is not illustrated or discussed in detail herein so as to avoid unnecessarily obfuscating the present invention. For purposes of understanding the present invention, it is sufficient to recognize that additional conventional equipment of this type may be useful in establishing and maintaining communications between the various users.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for distributing a call from a caller to a call center site, the method comprising:
    collecting a first dataset relating to said call from said caller in response to receiving the call at a hosting facility, wherein collecting the first dataset comprises forming a first set of data based on the first dataset in a first database, wherein said first dataset is collected at the hosting facility, the hosting facility comprising a network queuing system;
    queuing said call based on said first dataset;
    collecting, at the hosting facility, a second dataset from said call center site, wherein the call center site is located independently from the hosting facility, wherein the call center comprises a call center switch, and wherein the call center is adapted to receive and route a plurality of calls;

updating said first set of data in response to an update of said second dataset; and routing said call to said call center site based on said first and second datasets, wherein the second dataset is independent of the first dataset.

2. A method, as set forth in claim 1, further comprising:
answering said call on a telephone service provider network.

3. A method, as set forth in claim 2, further comprising:
executing a web application to insert said call in a queue.

4. A method, as set forth in claim 3, further comprising:
executing one or more scripts to collect said first dataset.

5. A method, as set forth in claim 4, further comprising:
upon receipt of a phone number to connect to, causing the telephone service provider network to transfer said call to said call center site.

6. A method, as set forth in claim 1, wherein collecting a first dataset, wherein said first set of data comprises a first table of data in the first database.

7. A method, as set forth in claim 1, wherein collecting a second dataset, further comprising:
controlling a server to collect said second dataset in a second database.

8. A method, as set forth in claim 7, further comprising:
determining routing of said call to indicate a decision about continuing to queue said call or transferring to a web application server.

9. A method, as set forth in claim 6, further comprising:
updating said first table of data in response to an update of said second dataset.

10. A method, as set forth in claim 8, further comprising:
determining an availability of an agent at said call center site; and
if an agent is available to take said call, populating a field with a phone number to dial said call center site.

11. A method, as set forth in claim 10, further comprising:
delivering the phone number to said web application server.

12. A method, as set forth in claim 9, further comprising:
monitoring said call center site to update said second dataset.

13. A method, as set forth in claim 12, further comprising:
upon a query about the update of said second dataset, returning an updated second dataset.

14. A method, as set forth in claim 1, further comprising:
running a report on a switch at said call center site to scrape up data from said call center site.

15. A method, as set forth in claim 14, further comprising:
parsing said data into at least on of the first database or a second database.

16. A system for distributing a call from a caller to a call center site, the system comprising:
a web application server including a memory storing a web application to route said call to said call center site;
a first server communicatively coupled to said web application server, the first server to collect a first dataset relating to said call from said caller to queue said call based on said first dataset, and determine routing of said call, wherein collecting the first dataset comprises forming a first set of data based on the first dataset in a first database;
a second server communicatively coupled to said first server, the second server to provide a second dataset related to said call center cite to said call center site to update queuing of said call based on said first and second datasets, wherein the second dataset is independent of the first dataset; and
wherein the first server is adapted to update said first set of data in response to an update of said second dataset.

17. A system, as set forth in claim 16, wherein said web application is a Voice Extensible Markup Language application.

18. A system, as set forth in claim 16, wherein said memory in said web application server stores welcome and prompt scripts.

19. A system, as set forth in claim 16, wherein said first server includes:
memory storing scripts that control communication to said second server and web application server; and
a database storing said first dataset in a first table indicative of queuing of said call at said web application server based on one or more call and caller parameters.

20. A system, as set froth in claim 16, wherein said second server includes:
a memory storing script that controls communication to said first server and said call center site; and
a database storing said second dataset in a second table indicative of queuing of said call at said call center site based on one or more call center site parameters.

21. A non-transitory, computer readable program storage device for storing instructions that, when executed cause a processor-based system to:
collect a first dataset relating to a call from a caller, wherein said first dataset is collected at a hosting facility, the hosting facility comprising a network queuing system, wherein collecting the first dataset comprises forming a first set of data based on the first dataset in a first database;
queue a call based on said first dataset;
collect, at the hosting facility, a second dataset from a call center site, wherein the call center site is located independently from the hosting facility;
update said first set of data in response to an update of said second dataset; and
route said call to said call center site based on said first and second datasets,
wherein the second dataset is independent of the first dataset.

22. A non-transitory, computer readable program storage device, as set forth in claim 21, comprising a medium storing instructions that, when executed cause a processor-based system to:
answer said call on a telephone service provider network.

23. A non-transitory, computer readable program storage device, as set forth in claim 22, comprising a medium storing instructions that, when executed cause a processor-based system to:
execute a web application to insert said call in a queue.

24. A non-transitory, computer readable program storage device, as set forth in claim 23, comprising a medium storing instructions that, when executed cause a processor-based system to:
execute one or more scripts to collect said first dataset.

25. A non-transitory, computer readable program storage device, as set forth in claim 24, comprising a medium storing instructions that, when executed cause a processor-based system to:
upon receipt of a phone number to connect to, cause the telephone service provider network to transfer said call to said call center site.

26. A non-transitory, computer readable program storage device, as set forth in claim 21, comprising a medium storing instructions that, when executed cause a processor-based system to:

form the first set of data wherein the first set of data comprises a first table of data in the first database.

27. A non-transitory, computer readable program storage device, as set forth in claim 21, comprising a medium storing instructions that, when executed cause a processor-based system to:
control a server to collect said second dataset in a second database.

28. A non-transitory, computer readable program storage device, as set forth in claim 27, comprising a medium storing instructions that, when executed cause a processor-based system to:
determine routing of said call to indicate a decision about continuing to queue said call or transferring to a web application server.

29. A non-transitory, computer readable program storage device, as set forth in claim 26, comprising a medium storing instructions that, when executed cause a processor-based system to:
update said first table of data in response to an update of said second dataset.

30. A non-transitory, computer readable program storage device, as set forth in claim 28, comprising a medium storing instructions that, when executed cause a processor-based system to:
determine an availability of an agent at said call center site; and
if an agent is available to take said call, populate a field with a phone number to dial said call center site.

31. A non-transitory, computer readable program storage device, as set forth in claim 30, comprising a medium storing instructions that, when executed cause a processor-based system to:
deliver the phone number to said web application server.

32. A non-transitory, computer readable program storage device, as set forth in claim 29, comprising a medium storing instructions that, when executed cause a processor-based system to:
monitor said call center site to update said second dataset.

33. A non-transitory, computer readable program storage device, as set forth in claim 32, comprising a medium storing instructions that, when executed cause a processor-based system to:
upon a query about the update of said second dataset, return an updated second dataset.

34. A non-transitory, computer readable program storage device, as set forth in claim 21, comprising a medium storing instructions that, when executed cause a processor-based system to:
run a report on a switch at said call center site to scrape up data from said call center site.

35. A non-transitory, computer readable program storage device, as set forth in claim 34, comprising a medium storing instructions that, when executed cause a processor-based system to:
parse said data into at least on of the first database or a second database.

* * * * *

UNITED STATES PATENT AND TRADEMARK OFFICE
CERTIFICATE OF CORRECTION

| | | |
|---|---|---|
| PATENT NO. | : 7,929,685 B1 | |
| APPLICATION NO. | : 10/854939 | |
| DATED | : April 19, 2011 | |
| INVENTOR(S) | : Robert B. Boyet et al. | |

It is certified that error appears in the above-identified patent and that said Letters Patent is hereby corrected as shown below:

In column 9, line 49, in Claim 15, delete "on of the" and insert -- one of the --, therefor.

In column 9, line 64, in Claim 16, after "related to" delete "said call center cite to".

In column 10, line 16, in Claim 20, delete "froth" and insert -- forth --, therefor.

In column 12, line 27, in Claim 35, delete "on of the" and insert -- one of the --, therefor.

Signed and Sealed this
Third Day of July, 2012

David J. Kappos
*Director of the United States Patent and Trademark Office*